Patented June 13, 1939

2,162,585

UNITED STATES PATENT OFFICE 2,162,585

AERATED PRODUCTS

Albert Musher, New York, N. Y., assignor to Musher Corporation, Elizabeth, N. J., a corporation of New Jersey No Drawing. Application December 14, 1937, Serial No. 179,791

10 Claims. (Cl. 99—144)

This invention relates to aerated products, particularly aerated food products, and to methods and compositions for producing the same, resulting in new qualities of creaminess, smoothness, and improved physical characteristics as regards flavor, texture, body, color, consistency, etc.

It has been recognized that aeration is desirable in products, particularly food products, in order to increase their specific volume, and to improve characteristics such as creaminess, smoothness and so on. Aeration of food products has, however, been quite limited because of the nature of the products themselves, and the fact that either due to their physical conditions or other characteristics, they did not lend themselves to aeration or to retention of ingested air. In aeration of a food product two things must be taken into consideration. One has to do with the incorporation of air into the product, or of the ability of the product to take in the air, while the other deals with the ability of the product to hold the air once the air has been incorporated into it. For one or the other of these reasons, most food products do not lend themselves to aeration. This is particularly true of products which, although they could be aerated in the first instance, during transportation or other handling where they were subjected to agitation, the air beaten into the product would be lost by such movement.

Among the objects of the present invention is the production of food products which are modified in order to enable them to be aerated, or to retain ingested air that has been beaten or stirred into such products.

Still further objects are concerned with methods of modifying compositions normally unsuited to aeration or to retention of ingested air, to enable them by ready and simple modification to be converted into aerated products of substantially stable character.

Still further objects include the production of food products of aerated character as described above, as well as methods of producing and methods of packaging such food products, and components utilizable therein.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accordance with the present invention products, particularly of the character utilizable for food, are modified in order to enable them to be aerated, as by stirring or beating, and to retain air ingested into the same by such methods, particularly in connection with food products which normally are not susceptible of aeration. A wide variety of extensible products may be treated in accordance with the present invention, including such products as prepared mustard, jellies, jams, mayonnaise, salad dressing, etc., so that both fibrous and non-fibrous, aqueous and non-aqueous products are included. Such products which are normally incapable of retaining ingested air are rendered susceptible to aeration and to retention of ingested air by the incorporation of ingredients which convert them into beating consistency, enabling them to be subjected to beating or stirring operations with ingestion of air which is subsequently retained therein. The nature of the product may be such that the ingestion of air may take place either at normal room or atmospheric temperatures, or at higher temperatures, so that even at room temperatures or atmospheric temperatures products are produced having the desired characteristics. For that purpose components which may generally be classified as airifiers or air integrators are utilized. The nature of such component varies with the nature of the product undergoing treatment.

Products of substantially normal solid consistency, or even in the nature of semi-solid materials may receive the addition of plasticizers of plastic or semi-solid consistency in an amount sufficient to give the resulting composition beating consistency, which coupled with the desired elasticity of the product will enable the air to be beat into the same, and at the same time enable its retention in the product when ready for the market. Depending on the nature of the product to be subjected to such treatment, an amount of hard, semi-solid or plastic oil or fat of animal, vegetable or mineral origin may be employed, either with or without a water-bodier material where the latter is desired. While other types of plasticizers may be employed, such as plastic waxes, resins, etc., either with or without fats and oils of the character set forth above, the fatty plasticizers are particularly emphasized as important for use in this connection, since for most of the food products, they directly lend themselves to incorporation, giving the characteristics desired in the final product. In some incorporations, even the inclusion of fatty oils may be necessary, as, for example, in admixture with relative hard fats, to give beating consistency to the material. But for the majority of food products, a semi-solid or plastic oil or fat is the most desirable ingredient to be employed for addition to any of the stated products in order to convert them into products of beating consistency.

Beating consistency may be defined as a consistency of soft enough character to enable the product to be beaten or stirred readily for incorporation of air, while exhibiting substantial plasticity or elasticity sufficient to retain the ingested air.

As noted, water-bodying materials may be utilized in many instances. The inclusion of a water-bodier depends on the nature of the product and the extent of its aqueous character. Where food products contain substantial quantities of water or aqueous liquid, the incorporation of fat or oil tends to produce a product subject to segregation or separation, even though the fat may be beaten into it; or the resulting product does not submit to substantial aeration, that is retention of ingested air. In such cases as this, the products containing such substantial quantities of aqueous material as would be subject to segregation or separation upon incorporation of fat or oil, may be treated with water-bodiers, such as gums, pectin, gelatin, etc., or they may be cooked with such products as cornstarch, tapioca, etc., and the resulting product incorporated with the fat or oil. Or in some cases, as, for example, with maple syrup, a heavy paste may be made by cooking cornstarch and water together and then mixing such mass with the maple syrup. Fat may then be incorporated in the required proportions, resulting in a product which does not exhibit any substantial separation of fat or oil.

In some instances, the inclusion of water-bodiers, or the amount to be included, will depend on the absence or presence of such water-bodiers naturally in the product undergoing treatment. The presence or absence, therefore, of such water-bodier material should be taken into consideration in connection with the inclusion of such water-bodier in the composition.

The incorporation of oil or fat of the character set forth above, with or without water-bodier material, results in a product which is susceptible of aeration, and which retains such aeration under the disturbing conditions of transportation, etc. The resulting products may then be subjected to beating in any of the standard mixing or beating machines, or processed in other aerating equipment, and if desired air may be blown into the product during the beating or other operation in order to assist in the process.

In the preparation of products in accordance with the present invention, the fat, with or without the water-bodier material as may be necessary under given conditions, may be introduced at any point in the manufacture of the product itself.

In general, the amount of semi-solid, plastic or hardened fat or oil should be a minimum for the particular purposes in hand, and seldom need exceed more than a relatively low amount, substantially less than 50% of the composition being treated, since it is not desired generally to change the consistency of the product at normal temperatures, other than to give it beating characteristics. The amount of the airifier or plasticizer should be limited to the minimum amount necessary for that purpose. This is particularly true because the amount of fat, with or without water-bodier material, may be used to influence not only the amount of air that is taken into the product, but other physical characteristics, and the use of minimum quantities of airifier or plasticizer, particularly of fatty character, results in products of lighter and creamier consistency devoid of undesirable heaviness. It is apparent that the amount of such components employed will vary with the nature of the material being treated, as well as with the airifier or plasticizer employed, but they may be readily adjusted both in character and amount in accordance with the present invention to give desired types of products.

The plasticizer or airifier, particularly when plastic or semi-solid fat or oil, with or without the water-bodier where required, yields a final product which when whipped gives it the property of retaining ingested air, resistant to shaking, handling and other agitation incident to transportation, distribution, etc. Also, as indicated above, where there is an excess of water or aqueous material, and where there is a tendency for segregation or separation upon the addition of the required amount of semi-solid or plastic oil or fat, then the water-bodiers tend to produce a unitary material holding the aqueous elements in the composition, reducing any tendency of segregation of the fat particles, and enabling the oil or fat to function in its ordinary aerating capacity.

Several examples may be utilized to illustrate the present invention. Thus in the following example, the use of a fat alone as the airifier or plasticizer is demonstrated. Thus a salad dressing of the usual type containing about 20% salad oil, may be admixed with hydrogenated oil of about 100° M. P. in the ratio of 307 grams of salad dressing to 35 grams of hydrogenated oil. The hydrogenated oil may be whipped first, if desired, and the components admixed together, and the product then whipped hard in the beating machine for several minutes. The amount of hydrogenated oil referred to may be varied within wide limits, depending on the characteristics of the resulting product desired, since such hydrogenated oil of 100° melting point is substantially plastic and may be incorporated in any amount desired. While a salad dressing containing about 20% of salad oil has been referred to for use in this connection, any of the liquid salad oil bases, or of the starch base type of dressings, may be similarly employed. As exemplary of a product in which a water-bodier is used in conjunction with the fat, the following is given. 300 parts by weight of prepared mustard may be admixed with 12 parts by weight of cornstarch, and the materials cooked together until the mixture stiffens substantially. The resulting mixture may then be placed in a mixing bowl, and mixed vigorously in order to cool, whereupon 40 grams of hydrogenated oil of plastic character, such as 100° melting point, may be added and the product intimately agitated for several minutes.

While in the examples given above reference has been made particularly to substantially plastic fats, much harder oils or fat other than plastic or semi-solid materials may be used to advantage in the production of these aerated food products. Where the hard oil or fat is employed presents difficulties in beating, the hard oil or fat may first be heated to a temperature at which it is softened to plastic or pliable condition, and this material at such temperature admixed with such food product in the usual way. Aeration is effected during the mixing operation, and upon cooling and standing, the hard fat which has been dispersed throughout the product resumes its original hard form, and offers substantial advantage in retention of the air in the product.

While the oils or fats have been particularly emphasized in connection with airifiers or plasticizers in connection with the present invention, they may be modified to include emulsification or whipping adjuvants, such as lecithin, albumen, or combinations thereof. Thus 5 to 10% of such adjuvants may be incorporated with the plastic oil or fat.

In some instances, aerated products produced with such added fat airifiers may exhibit white spots or speckiness, apparently, for example, in such products as prepared mustard possibly due to the fact that the fat particles are not thoroughly and uniformly dispersed throughout the product. In such cases, if desired, the fat may be colored with any added desired coloring material to correspond with that of the product into which it is incorporated, or if desired the product may be heated to a temperature approaching the melting point of the fat, either of which expedients eliminates substantially the conditions referred to, and result in a produce of much better fat dispersion.

The invention may be utilized not alone in connection with salad dressing or similar products, but also generally in connection with emulsions, dispersions, suspensions, and food products of various types. In emulsions and dispersions dependent on the use of emulsifying agents, the amount of such emulsifying agent required may be reduced where fats are incorporated therein in accordance with the present invention, due to the fact that the semi-solid or plastic fat appears to exhibit an added emulsification value, reducing the necessity for the emulsifying agent, or the amount which would be required in its absence.

In some instances it has been observed that the incorporation of an amount of fat in excessive proportions with respect to other materials, particularly when substantial quantities of aqueous materials are present, tends to produce a product subject to separation or segregation in which the fat particles may separate from the remainder of the materials present, or there may be a tendency to a product of water-in-oil emulsion type, which latter type of product does not lend itself so readily to the addition or incorporation of water and other aqueous materials for purposes of thinning, or which do not mix as well as may be desired with other foods, particularly of aqueous character. In such instances, the broken emulsion, the separated mass, or the water-in-oil emulsions, may be mixed with an oil-in-water emulsion, such as mayonnaise, egg yolk, or with an emulsion prepared with lecithin or other types of emulsifying agents, etc. It is not generally necessary to make the completed oil-in-water emulsion or emulsion-like product in advance, and then to incorporate this into the excessive fat-containing material, but the various ingredients of the oil-in-water emulsion, such as water, lecithin, preferably mixed in vegetable oil, may be added to the product to produce a resulting material of oil-in-water type. The specific quantities and adjustment of material will depend on the nature of the product undergoing treatment, but it is a simple matter to effect adjustment to the type of product or the ingredients that are being used resulting in a final product to which aqueous materials may be added without segregation or separation that would otherwise occur. For example, a salad dressing may be made by substituting hydrogenated oil for the liquid oil normally used, and with such hydrogenated oil there may be incorporated a small amount of egg yolk, together with spices, vinegar, water and other ingredients normally used in making the salad dressing. Such product would be of water-in-oil type emulsion, and would form a separated mass upon the addition of aqueous materials, for example, water and vinegar, particularly when there is a high amount of hydrogenated oil in the product, and particularly when the aqueous materials are increased in quantity. This product, therefore, either before or after separation may be mixed with an amount of egg yolk, a lecithin emulsion, or an oil-in-water emulsion in sufficient quantity to prevent separation or segregation. The resulting admixture is a product which can be materially modified with respect to water content, as for example by increased amounts of aqueous materials, such as the water and vinegar, without segregation or separation. In other words, in this way the water-in-oil type product has been converted to an oil-in-water type material subject to dilution with or incorporation of aqueous materials without the undesired separation.

Aside from the water-absorption qualities that are developed by such methods as those noted above, there are also other important advantages that are obtained in the consistency, texture and body of the product. This will be apparent from the fact that an emulsion or emulsion-type product has a continuous phase which generally resembles in texture, body and consistency the material or materials that make up such continuous phase. In an oil-in-water emulsion, this continuous phase has a softness or liquidity that more nearly approaches the softness and liquidity of the aqueous materials, or the aqueous materials and water-soluble binders present. On the other hand, a water-in-oil emulsion as, for example, any product where the continuous phase contains a hydrogenated oil, exhibits a close resemblance in texture, body, etc., to the hydrogenated oil which constitutes wholly or in large part the continuous phase of such water-in-oil emulsion. Consequently, in making products in accordance with the present invention where it is desirable or preferable to avoid the fatty, substantially thick and heavy-walled characteristics that result from the use of an excess of semi-solid or plastic oils or fats, they may be mixed, as described, with the proper amounts of oil-in-water emulsion, or egg yolk, or similar materials. Apparently the water-in-oil emulsion is taken into the fat portion of the oil-in-water emulsion, or at least incorporated in such way that the final product exhibits characteristics of an oil-in-water emulsion, or of an oil-in-water emulsion-like products, from the standpoint of water absorption qualities, flavor, texture, consistency and so on.

Among the advantages of the products of the present invention, it may be noted that they contain a substantially larger amount of air than would normally be possible, and, therefore, exhibit greater volume—a factor of considerable importance in a number of ways, both with respect to costs and to various selling factors, and in other ways. For a container of a given size, less product by weight of the aerated material is necessary than of the non-aerated product, resulting in substantially less shipping weight, freight cost, etc. In one example, 8 fluid ounces of the product produced in accordance with the first example of a salad dressing as given above, weighed approximately 187 grams against a weight of 249 grams of the non-aerated salad dressing. With respect to the second example given above 8 fluid ounces of the mustard product weighed 196 grams against the non-aerated product of similar volume weighing 272 grams.

Products produced in accordance with the present invention exhibit substantially smoother and creamier characteristics, both in texture and flavor, showing very substantial improvement over the non-aerated products.

Because of the aeration of the products produced in accordance with the present invention, they retain their structure or form much better in use without loss of fluffiness and lightness.

Products of the present invention exhibit much better spreading quality in that they do not soak into the bread or other foods over which they are spread, or over which they are used to the usual extent of the non-aerated products, so that they are extended further than is normally possible with non-aerated products, and are more economical. Both the use of the plastic fat in the products and the aerated condition of the material contribute to such qualities Products produced in accordance with the present invention exhibit a marked tendency in reduction of the usual separation of components present as, for example, in prepared mustard, which is much less susceptible to segregation of vinegar or aqueous materials than would be true in normally prepared mustard products.

The products of the present invention retain their structure and character in transportation and through various temperature changes to an extent much greater than the non-aerated products. This is particularly true of emulsions, dispersions and similar products. Apparently, the cell walls of the products have greater resiliency exhibiting a cushioned effect when subjected to jarring, handling, etc., of transportation or changes in weather conditions as, for example, freezing.

Other advantages are resident in the fact that emulsions may be given extensive beating without resulting in breaking or segregation. Ordinarily in the production of emulsions of the usual type, it is considered inadvisable to subject the product to excessive agitation or whipping which results in a tendency of the emulsion breaking or to the loss of air carried in the emulsion. With products produced in accordance with the present invention, the production of the emulsion state is facilitated in view of the fact that the product may be subjected to excessive beating with substantially less tendency toward breaking or segregation, or loss of ingested air.

Furthermore under this invention, the addition of the plastic fat to the bodier or to the base product results in an opaqueness in color with elimination of most if not all of the transparency of the product normally produced in the absence of the application of the considerations of the present invention. Consequently, products produced in accordance with the present invention have the appearance of body, whereas actually the product exhibits lightness and fluffiness.

Aerated mustard or aerated salad dressing, or similar products produced in accordance with the present invention, exhibit less tendency to squeeze out as in the making of sandwiches and similar food products.

Furthermore, where condiments, vinegar, spices, etc. are present which have a tendency normally to irritate the mucous membranes of the digestive tract, stomach, and so on, products produced in accordance with the present invention are minimized in such characteristics in that the fat and air of the products form a protective covering and materially lessen irritation.

Because of the combination of opaque qualities, aeration, and the other resulting characteristics of products produced in accordance with the present invention, products even of substantially low fat content exhibit the appearance, texture, body and other characteristics of products normally produced having substantially higher contents of liquid oils. This is of particular importance in connection with products, such as salad dressings, etc., where normally higher oil contents are considered desirable.

The degree or extent of aeration varies with the product to be treated and the type of material to be made therefrom. In some products heretofore available on the market some slight amount of aeration was possible, as for example in certain mayonnaises a low percentage of air could be incorporated. Such percent of aeration was insufficient to accomplish the results sought by the present invention. With other types of products of the prior art, no substantial aeration to any desired degree could be secured at all. Under the present invention either type of product referred to above can be converted into a material having ingested air to an extent materially beyond that possible under prior art treatment; and the term "in substantial amount" as used herein covers the aerated product produced herein with substantial aeration as compared with products of either low or substantially no aeration as heretofore known in the art.

It has been found that the speed and intensity of mixing, beating, or processing certain products produced in accordance with the present invention, depending upon the proportions of ingredients used and their nature, effect a change of emulsion from oil-in-water to water-in-oil, and, therefore, variations in these operating methods may be used to control the character of product produced. Higher speed and more intense mixing tend to give water-in-oil type emulsions.

Where a thorough intermixture of fat in the product to be aerated produces a water-in-oil emulsion from an oil-in-water product, the plastic fat may first be whipped with air to aerate it, and this aerated fat then folded into or gently mixed or incorporated with the product to be aerated, giving in this way the desired airiness in the product to be aerated without changing the oil-in-water type character.

By the terms "fat" or "hard fat" as appears in this application, is meant any naturally or artificially hardened or plastic oil or fat, or any combinations thereof, or any material containing large proportions thereof.

By the terms "incapable of retaining ingested air" and "non-aeratable" as appears in this application is meant relatively or substantially incapable of retaining ingested air and relatively or substantially non-aeratable.

Having thus set forth my invention, I claim:

1. An aerated water-containing food material, which is normally incapable of retaining ingested air, and the water of which has been taken up by a water absorbent bodier, and which contains a dispersed hard fat, said bodier and fat forming a substantially plastic product that retains the ingested air.

2. An aerated water-containing food material, which retains substantially its original taste and flavor characteristics, and which is normally incapable of retaining ingested air at room temperature, and the water of which has been taken up by a water absorbent bodier, and which contains a dispersed hard fat, said bodier and fat forming a substantially plastic product that retains the ingested air.

3. An aerated water-containing food material, which is normally incapable of retaining ingested air, and the water of which has been taken up by a water absorbent bodier, and which contains a dispersed hard fat, said bodier and fat forming a substantially plastic product that retains the ingested air, said food material consisting of an oil-in-water emulsion and said hard fat being included as a water-in-oil emulsion.

4. The process of making aerated food materials from water-containing food products normally incapable of retaining ingested air, which comprises taking up the water thereof by a water absorbent bodier and adding a hard fat, and then whipping air therein.

5. The process of making aerated food materials from water-containing food products normally incapable of retaining ingested air, which comprises cooking the food with starch so as to take up the water thereof and then mixing with a hard fat having a melting point above room temperature and then whipping air into the materials.

6. The process of making aerated food materials from water-containing food products normally incapable of retaining ingested air, which comprises taking up the water thereof by a water absorbent bodier and adding a hard fat, and then whipping air therein and then heating the entire composition to a temperature approaching the melting point of the fat contained therein so as to reduce the fat speckiness in the product.

7. The process of making an aerated oil-in-water emulsion from ingredients which normally produce a water-in-oil emulsion after the addition of the hard fat, which comprises separately whipping the hard fat so as to aerate it and then gently mixing and folding in the beaten hard fat into the oil-in-water emulsion.

8. An aerated water-containing mustard, which is normally incapable of retaining ingested air, and the water of which has been taken up by a water absorbent bodier, and which contains a dispersed hard fat, said bodier and fat forming a substantially plastic product that retains the ingested air.

9. An aerated water-containing salad dressing, which is normally incapable of retaining ingested air, and the water of which has been taken up by a water absorbent bodier, and which contains a dispersed hard fat, said bodier and fat forming a substantially plastic product that retains the ingested air.

10. An aerated water-containing food material, which is normally incapable of retaining ingested air, and the water of which has been taken up by a gum, and which contains a dispersed hard fat, said gum and fat forming a substantially plastic product that retains the ingested air.

ALBERT MUSHER.